(12) United States Patent
Park

(10) Patent No.: US 8,566,854 B2
(45) Date of Patent: Oct. 22, 2013

(54) APPARATUS FOR ROTATING DISK WITH IMPROVED ANTI-SLIP TORQUE

(75) Inventor: Jaehyun Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/319,283

(22) PCT Filed: May 7, 2010

(86) PCT No.: PCT/KR2010/002911
§ 371 (c)(1),
(2), (4) Date: Nov. 7, 2011

(87) PCT Pub. No.: WO2010/128820
PCT Pub. Date: Nov. 11, 2010

(65) Prior Publication Data
US 2012/0054782 A1    Mar. 1, 2012

(30) Foreign Application Priority Data

May 8, 2009  (KR) .......................... 10-2009-0040152

(51) Int. Cl.
*G11B 17/028*    (2006.01)

(52) U.S. Cl.
USPC .............................. 720/710; 720/696; 720/712

(58) Field of Classification Search
USPC ................................................. 720/695–717
See application file for complete search history.

(56) References Cited

U.S. PATENT DOCUMENTS

| 5,671,210 | A | * | 9/1997 | Goto ............................... 720/711 |
| 6,041,033 | A | | 3/2000 | Otsubo et al. |
| 6,577,587 | B1 | * | 6/2003 | Kishibe et al. ................ 720/700 |
| 6,877,165 | B1 | * | 4/2005 | Aoki ............................... 720/710 |
| 7,979,874 | B2 | | 7/2011 | Park et al. |
| 2002/0031077 | A1 | * | 3/2002 | Shiwa ............................ 369/271 |

(Continued)

FOREIGN PATENT DOCUMENTS

| CN | 1185624 A | 6/1998 |
| CN | 1306276 A | 8/2001 |

(Continued)

OTHER PUBLICATIONS

International Search Report in International Application No. PCT/KR2010/002911, filed May 7, 2010.

(Continued)

*Primary Examiner* — Nathan Danielsen
(74) *Attorney, Agent, or Firm* — Saliwanchik, Lloyd & Eisenschenk

(57) ABSTRACT

An apparatus for rotating a disc is disclosed, wherein the apparatus for rotating the disc includes a rotation shaft; a turn table coupled to the rotation shaft and having a felt that makes contact with a disc; a center guide member inserted into the rotation shaft and coupled to an inner face of the disc; a clamp magnet sucking a clamp unit that is faced with the turn table and makes contact with an upper face of the disc toward the felt; an elastic member interposed between the turn table and the center guide member and the elastic member elastically supporting the center guide member in an axial direction of the rotation shaft, wherein an anti-slip torque that is applied to the upper face of the disc by using the clamp unit and the elastic member is stronger than a rotation torque that is generated by the turn table to prevent slipping of the optical disc from the turn table.

4 Claims, 2 Drawing Sheets

(56) References Cited

U.S. PATENT DOCUMENTS

| | | | |
|---|---|---|---|
| 2002/0150027 A1* | 10/2002 | Kato | 369/270 |
| 2007/0028255 A1* | 2/2007 | Ito et al. | 720/706 |
| 2007/0143773 A1* | 6/2007 | Park et al. | 720/706 |

FOREIGN PATENT DOCUMENTS

| | | |
|---|---|---|
| CN | 1905036 A | 1/2007 |
| JP | 62-086572 A | 4/1987 |
| JP | 62-089262 A | 4/1987 |
| JP | 64-042545 U | 3/1989 |
| JP | 03-168968 A | 7/1991 |
| JP | 04-044668 A | 2/1992 |
| JP | 08-180644 A | 7/1996 |
| JP | 08-287569 A | 11/1996 |
| JP | 09-027166 A | 1/1997 |
| JP | 09-128860 A | 5/1997 |
| JP | 10-162497 A | 6/1998 |
| JP | 11-025555 A | 1/1999 |
| JP | 2000-182306 A | 6/2000 |
| JP | 2002-203352 A | 7/2002 |
| JP | 2003-346404 A | 12/2003 |
| KR | 10-0278595 B1 | 1/2001 |
| KR | 10-2007-0066062 A | 6/2007 |
| KR | 10-2009-0022318 A | 3/2009 |

OTHER PUBLICATIONS

Office Action dated Nov. 9, 2012 in Japanese Application No. 2012-509737, filed May 7, 2010.

Office Action dated May 15, 2013 in Japanese Application No. 2012-509737, filed May 7, 2010.

Office Action dated Nov. 18, 2010 in Korean Application No. 10-2009-0040152, filed May 8, 2009.

Office Action dated Jun. 4, 2013 in Chinese Application No. 201080030475.5, filed May 7, 2010.

* cited by examiner

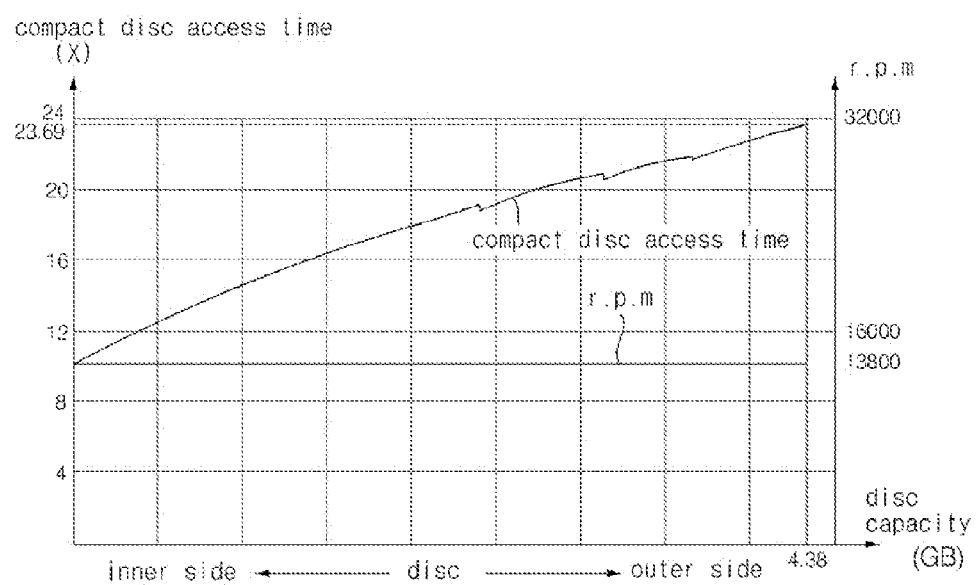

APPARATUS FOR ROTATING DISK WITH IMPROVED ANTI-SLIP TORQUE

CROSS-REFERENCE TO RELATED APPLICATION

This application is the U.S. national stage application of International Patent Application No. PCT/KR2010/002911, filed May 7, 2010, which claims priority to Korean Application No. 10-2009-0040152, filed May 8, 2009, the disclosures of each of which are incorporated herein by reference in their entirety.

TECHNICAL FIELD

The present invention relates to an apparatus for rotating a disc.

BACKGROUND ART

Recently, an optical disc drive (ODD) for reading data on an optical disc or for recording data on the optical disc has been developed.

The optical disc driver includes a disc-rotating device for rotating the optical disc and the disc-rotating device has a spindle motor, a turn table, and a clamp.

The turn table is coupled to a rotation shaft of the spindle motor. The turn table functions as a supporter for supporting the optical disc. The clamp presses an upper face of the optical disc to prevent a slipping of the optical disc from the turn table.

The spindle motor is rotated at a constant speed, usually 13,800 rpm to improve a data reading speed or a data recording speed.

However, a slipping is generated between the optical disc and the turn table due to a high speed rotation of the turn table whereby a disadvantage of a data reading error or a data recording error on optical disc is frequently generated.

DISCLOSURE OF INVENTION

Technical Problem

The present disclosure is to provide an apparatus for rotating a disk configured to prevent a slipping between a turn table and an optical disc that is mounted thereon to decrease a data reading error or a data writing error.

Solution to Problem

According to one aspect of the present disclosure, the object described above may be achieved by an apparatus for rotating a disk, the apparatus comprising: a rotation shaft; a turn table coupled to the rotation shaft and having a felt that makes contact with a disc; a center guide member inserted into the rotation shaft and coupled to an inner face of the disc; a clamp magnet sucking a clamp unit that is faced with the turn table and makes contact with an upper face of the disc toward the felt; an elastic member interposed between the turn table and the center guide member and the elastic member elastically supporting the center guide member in an axial direction of the rotation shaft, wherein an anti-slip torque that is applied to the upper face of the disc by using the clamp unit and the elastic member is stronger than a rotation torque that is generated by the turn table to prevent slipping of the optical disc from the turn table.

According to another aspect of the present invention, the object described above may be achieved by an apparatus for rotating a disk, the apparatus comprising: a rotation shaft; a turn table coupled to the rotation shaft and having a felt that makes contact with a disc; a center guide member inserted into the rotation shaft and coupled to an inner face of the disc; a clamp magnet sucking a clamp unit that is faced with the turn table and makes contact with an upper face of the disc toward the felt; an elastic member interposed between the turn table and the center guide member and the elastic member elastically supporting the center guide member in an axial direction of the rotation shaft, wherein an anti-slip torque that is applied to the upper face of the disc by using the clamp unit and the elastic member is stronger than a rotation torque that is generated by the turn table to prevent slipping of the optical disc from the turn table, the anti-slip torque is about 800 $g_f$·cm to about 1,500 $g_f$·cm, a force that pushes the center guide member to an axial direction of the rotation shaft from the elastic member is about 150 $g_f$ to about 170 $g_f$, and a force of the clamp unit that presses the optical disc is about 450$_f$ to about 550 $g_f$.

Advantageous Effects of Invention

In accordance with the apparatus for rotating a disc according to the present invention, the coefficient of friction of the felt that makes contact with the optical disc, the elasticity of the elastic member formed between the turn table and the center guide member, and the anti-slip torque that generated by the claim unit are improved to prevent slipping of the optical disc from the turn table and to reduce data reading error or data writing error of the optical disc.

BRIEF DESCRIPTION OF DRAWINGS

FIG. 3 is a graph illustrating a compact disc access time during a recording of data by using the apparatus for rotating the disc in accordance with the conventional disc rotating device.

MODE FOR THE INVENTION

Hereinafter, an apparatus for rotating a disc will be described in detail with reference to the accompanying drawings.

Figure 1:
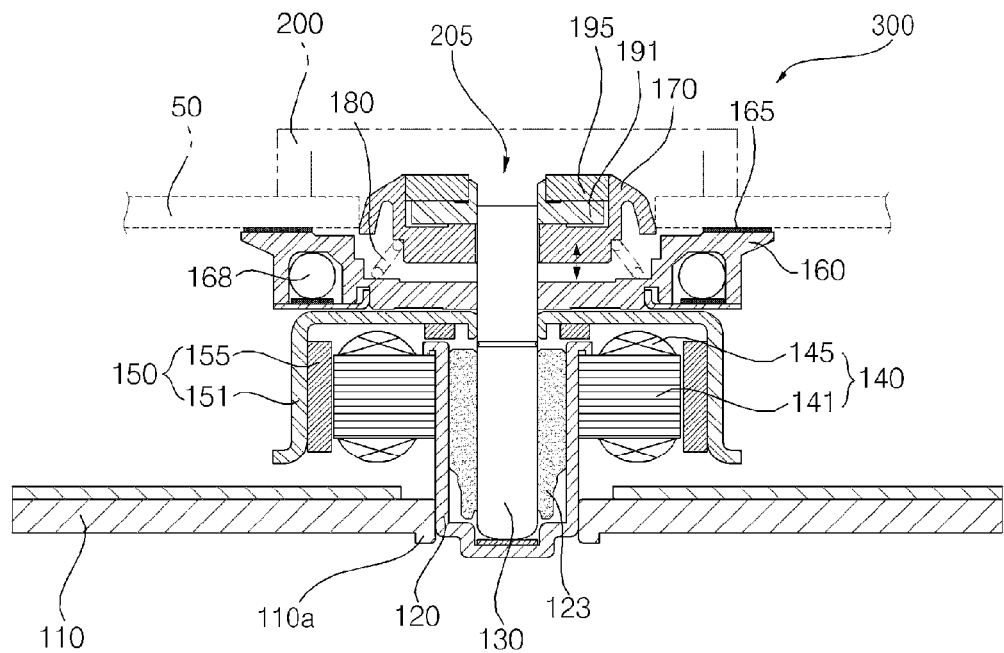
FIG. 1 is a cross-sectional view illustrating an apparatus for rotating an optical disc in accordance with one embodiment of the present invention.
Figure 2:
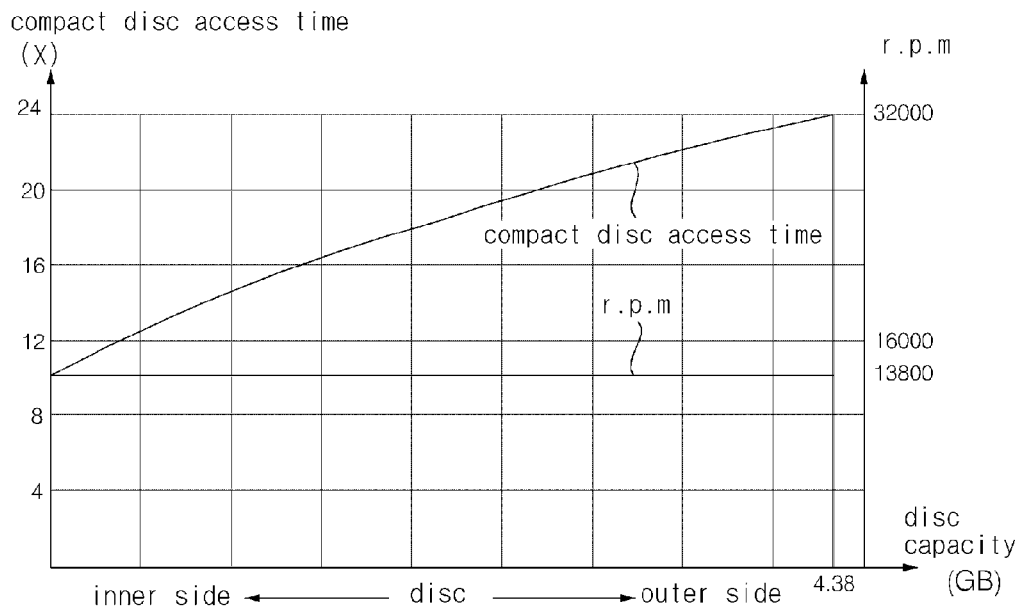
FIG. 2 is a graph illustrating a compact disc access time during a recording of data by using the apparatus for rotating the disc in accordance with one embodiment of the present invention.

FIG. 1 is a cross-sectional view illustrating an apparatus for rotating a disc in accordance with one embodiment of the present invention. FIG. 2 is a graph illustrating a compact disc access time during a recording of data by using the apparatus for rotating the disc in accordance with one embodiment of the present invention. FIG. 3 is a graph illustrating a compact disc access time during a recording of data by using the disc rotating device in accordance with the conventional disc rotating device.

The apparatus for rotating the disc 300 may include a rotation shaft 130, a turn table 160, a center guide member 170, and an elastic member 180. Additionally, the disc rotating device 300 may further include a base 110, a bearing housing 120, a bearing 123, a stator 140, and a rotor 150.

The base 110, for example, is a portion of an optical disk drive (ODD), and the base 110 has a burring portion 110a that is outwardly extruded from the base 110. The burring portion 110a may have a through-hole.

The bearing housing 120 is coupled to the through-hole of the base 110 by using the burring portion 110a. The bearing housing 120 is disposed in a direction perpendicular to the base 110.

The bearing housing 120 has a top-opened cylindrically hollow-can shape, and a side face of the bearing housing 120 is combined with the base 110.

The bearing 123, for example, has a pipe shape and the bearing 123 is disposed in the bearing housing 120. In this exemplary embodiment of the present invention, the bearing 123 may include an oil impregnated sintering bearing.

The rotation shaft 130 is rotatably inserted into a hollow of the bearing and a top end portion of the rotation shaft 130 is protruded from the bearing 123.

The stator 140 may include a core 141 and a coil 145.

The core 141 includes the stacked iron cores having a thin thickness and the coil 145 is wounded around the core 141. The core 141 has a through-hole that is positioned to a center portion of the core 141, and the core 141 is coupled to a circumferential surface of the bearing housing via the through-hole.

The rotor 150 is combined with the rotation shaft 130. The rotor 150 includes a rotor yoke 151 and a magnet 155.

The rotor yoke 151 has a bottom-opened cylindrically hollow-can shape and the magnet 155 is disposed on an inner face of a side plate of the rotor yoke 151. The magnet 155 and the core 141 face with each other.

In a case an electrical current is applied to the coil 145 of the stator 140, a rotation force is generated by a magnetic field generated from the coil 145 and a magnetic field generated from the magnet 155, thereby rotating the rotor yoke 151 and the rotation shaft 130 by using the rotation force.

The turn table 160 is fixed to a circumferential surface of the rotation shaft 130 that is extruded from an upper face of the rotor yoke 151 and the turn table 160 is rotated according to a rotation of the shaft 130.

At least one felt 165 which makes direct contact with an optical disc is disposed on an upper face of the turn table 160. The felt 165 may prevent the optical disc from slipping on the turn table 160. In the exemplary embodiment of the present invention, in order to prevent the optical disc from slipping on the turn table 160, the felt 165 may include a silicon material or a urethane material having a high coefficient of friction in comparison with that of a Cl rubber.

A recess is formed at a center portion of the upper face of the turn table 160 to secure the elastic member 180 (described later) at the turn table 160.

A doughnut shaped groove is formed at a lower face opposite to the upper face of the turn table 160 and at least one automatic balancing ball 168 is disposed in the groove to compensate an eccentric of the turn table 160 and the optical disc 50.

A center guide member 170 is inserted into the circumferential surface of the rotation shaft 130 by using a through-hole of the center guide member 170.

The center guide member 170 moves along in a axial direction of the rotation shaft 130. The center guide member 170 makes contact with an inner face of the optical disc 50 to align a center of rotation of the rotation shaft 160 with that of the optical disc 50.

The elastic member 180 is interposed between the turn table 160 and the center guide member 170 facing the turn table 160 and one end portion of the turn table 160 is disposed in the recess formed at the center portion of the upper face of the turn table 160.

The elastic member 180, for example, includes a coil-spring and the elastic member 180 may be formed in a circular truncated cone shape. That is, the one end portion that makes contact with the turn table 160 may have a first diameter and the other end portion that makes contact with the center guide member 170 may have a second diameter less than the first diameter.

The elastic member 180 pushes the center guide member 170 toward the axial direction of the rotation shaft 130 and the direction of radius of the rotation shaft 140 to align the center of rotation of the optical disc 50 with the center of rotation of the rotation shaft 130.

The clamper 205 may include a clamp plate 191, a clamp magnet 195, and a clamp unit 200.

The clamp plate 191 is disposed on an upper face of the center guide member 170 and the clamp plate 191 is inserted into the circumferential surface of the rotation shaft 130.

The clamp magnet 195 is disposed on the clamp plate 191 and the clamp magnet 195 is attached to the clamp plate 191 by using an adhesive.

The clamp unit 200 is disposed over the center guide member 170 and the clamp unit 200 may have a bottom-opened cylindrical hollow-can shape. The claim unit 200 may be composed of a metal.

The clamp unit 200 presses the optical disc 50 disposed on the turn table 160 by using the clamp magnet 195 on the center guide member 170.

After the optical disc 50 is inserted into the center guide member 170 and the optical disc 50 is then disposed on the felt 165, the clamp unit 200 descends toward the turn table 160 using the clamp magnet 195 so that the clamp unit 200 makes contact with the optical disc 50.

After the center guide member 170 makes contact with the inner face of the optical disc 50 and the clamp unit is then closed to the optical disc 50, an anti-slip torque that is generated from the clamp unit 200 pressing the optical disc 50 is stronger than a rotation torque of the turn table 160 for rotating the optical disc 50 so as not to slip the optical disc 50 from the turn table 160.

However, in a case the anti-slip torque that is generated by the clamp unit 200 and the center guide member 170 is weaker than the rotation torque of the turn table 160 for rotating the optical disc 50, the optical disc 50 may slip from the turn table 160.

Also, in a case the anti-slip torque that is generated by the clamp unit 200 and the center guide member 170 is weaker than the rotation torque of the turn table 160 for rotating the optical disc 50, the center of rotation of the optical disc 50 is not aligned with the center of rotation of the turn table 160.

In a case the optical disc 50 rotated by the turn table 160 slips on the turn table 160, a data reading error or a data writing error may occur thereon.

In the exemplary embodiment of the present invention, In order to prevent slipping of the optical disc 50 from the turn table 160, the anti-slip torque may be about 800 $g_f$·cm to about 1,500 $g_f$·cm.

In a case the anti-slip torque for preventing slipping of the optical disc 50 from the turn table 160 is about 800 $g_f$·cm, the optical disc 50 does not slip from the turn table 160 at 13,800 rpm with the anti-slip torque of about 800 $g_f$·cm.

However, in a case the anti-slip torque for preventing slipping of the optical disc 50 from the turn table 160 is weaker than about 800 $g_f$·cm, the optical disc 50 may slip from the turn table 160 whereby an compact disc access time (X) is somewhat slowed in comparison with a determined compact disc access time. Thus, the data reading error or the data writing error may occur based on an inaccurate compact disc access time (X).

Meanwhile, in a case the anti-slip torque for preventing slipping of the optical disc 50 from the turn table 160 is stronger than about 1,600 $g_f$·cm, the optical disc 50 may be stuck to the felt 165 by a heat that generated from a pressure force between the felt 165 and the disc 50.

Thus, preferably, the anti-slip torque for preventing slipping of the optical disc 50 from the turn table 160 is about 800 $g_f$·cm to about 1,500 $g_f$·cm.

In the exemplary embodiment of the present invention, in order to improve the anti-slip torque for preventing slipping of the optical disc 50 from the turn table 160, the felt 165 may have a high coefficient of friction. To realize that, the felt 165 of the turn table 160 may include a silicon material or a urethane material instead of Cl rubber.

In order to improve the anti-slip torque, a force from the elastic member that pushes the center guide member 170 to an axial direction of the rotation shaft 130 from the elastic member 180 must be increased.

The force that pushes the center guide member 170 to the axial direction of the rotation shaft 130 from the elastic member 180 may be about 150 $g_f$ to about 170 $g_f$.

However, in order to improve the anti-slip torque, a suction force between the clamp unit 200 and the clamp magnet 195 may be increased.

To realized that, the suction force between the clamp unit 200 and the clamp magnet 195 may be about 450 $g_f$ to about 550 $g_f$. A gap formed between the clamp unit 200 and the clamp magnet 195 may be about 0.7 mm.

In the exemplary embodiment of the present invention, in order to improve the anti-slip torque, the felt 165 having the high coefficient of friction is employed instead of the Cl rubber. Thus, after forming the felt 165 having the high coefficient of friction on the turn table 160, a tension of the elastic member 180 or a magnetic force of the clamp magnet 195 may be adjusted so that the anti-slip torque for preventing slipping of the optical disc 50 from the turn table 160 can be improved.

In this embodiment of the present invention, in a case the coefficient of friction of the felt that makes contact with the optical disc, and a modulus of elasticity of the elastic member interposed between the turn table and the center guide member are improved so that the anti-slip torque can increase to prevent slipping of the optical disc from the turn table and to reduce the data reading error or the data writing error.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

The invention claimed is:

1. An apparatus for rotating a disk comprising:
   a rotation shaft;
   a turn table coupled to the rotation shaft and having a felt that makes contact with a disc;
   a center guide member inserted into the rotation shaft and coupled to an inner face of the disc;
   a clamp magnet sticking a clamp unit that is faced with the turn table and makes contact with an upper face of the disc toward the felt; and
   an elastic member interposed between the turn table and the center guide member and the elastic member elastically supporting the center guide member in an axial direction of the rotation shaft,
   wherein an anti-slip torque that is applied to the upper face of the disc by using the clamp unit and the elastic member is stronger than a rotation torque that is generated by the turn table to prevent slipping of the optical disc from the turn table,
   wherein a force that pushes the center guide member to the axial direction of the rotation shaft from the elastic member is about 150 $g_f$ to about 170 $g_f$,
   wherein a force of the clamp unit that presses the optical disc is about 450 $g_f$ to about 550 $g_f$, and
   wherein the anti-slip torque is about 800 $g_f$·cm to about 1.500 $g_f$·cm.

2. The apparatus of claim 1, wherein the felt is at least one selected from the group consisting of a silicon material and a urethane material.

3. The apparatus of claim 1, wherein a gap between the clamp unit and the clamp magnet is about 0.7 mm.

4. The apparatus of claim 1, further comprising:
   a stator having a bearing receiving the rotation shaft, a bearing housing coupled to the bearing, a core coupled to an outer face of the bearing housing, and a coil that is wound to the core; and
   a rotor having a magnet that is coupled to the rotation shaft and is faced with the core.

* * * * *